B. B. AYERS.
HUB FOR WIRE WHEELS.
APPLICATION FILED FEB. 4, 1913.
1,151,646.
Patented Aug. 31, 1915.
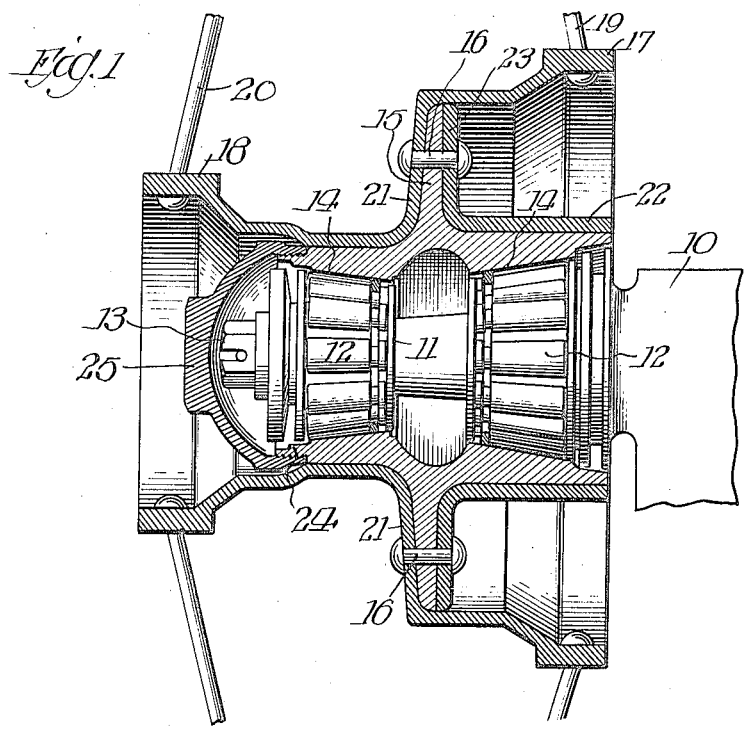
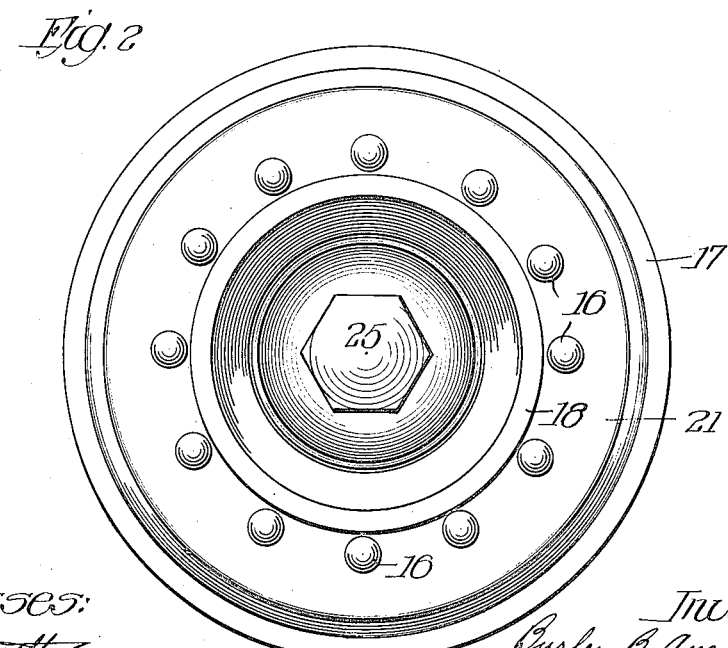

UNITED STATES PATENT OFFICE.

BURLEY B. AYERS, OF OAK PARK, ILLINOIS, ASSIGNOR TO THE AMERICAN STEEL & WIRE COMPANY OF NEW JERSEY, OF HOBOKEN, NEW JERSEY, A CORPORATION OF NEW JERSEY.

HUB FOR WIRE WHEELS.

1,151,646.

Specification of Letters Patent. Patented Aug. 31, 1915.

Application filed February 4, 1913. Serial No. 746,206.

*To all whom it may concern:*

Be it known that I, BURLEY B. AYERS, a citizen of the United States, and residing in Oak Park, in the county of Cook and State of Illinois, have invented certain new and useful Improvements in Hubs for Wire Wheels, of which the following is a specification.

My invention relates to wheels for vehicles and has particular reference to a novel hub for use with wire wheels.

Manufacturers and users of vehicles, particularly automobiles, are coming to a realization that wire wheels are particularly advantageous in connection with pneumatic tires. Such wheels have been found by tests to provide greater length of service for various reasons not the least of which is the lessened heat conductivity of the wire wheel over that of solid wood or metal construction. It is, however, desirable in the present state of the industry that means should be provided whereby a vehicle owner may readily replace his wooden wheels for those of skeleton wire construction. This is not possible at the present time for the reason that to apply wire wheels to the axles of automobiles would require an entire change in the axle bearing construction. This would make the cost so high as to be prohibitive.

An object of my invention is therefore to provide a hub which may be readily applied to the axles of automobiles already in service without modifications in the bearing construction already on the car.

A further object is to provide a hub of such simple construction that an ordinary mechanic being supplied with a hub, spokes and rim may construct a wire wheel within a short time. Thus the wheels may readily be built up in any garage or machine shop. My invention is therefore directed particularly to a hub of simple construction, having a bearing portion which is separable from the hub proper whereby the hub may be assembled with the bearing portion of the proper contour to fit the axle bearings of the car in question and a set of wire wheels built up within a short time which may be placed on the car axles and properly fitting the same without entailing a large amount of expense.

My invention will be more readily understood by reference to the accompanying drawings, wherein, Figure 1 is a transverse vertical section through a wire wheel hub constructed in accordance with my invention, the hub being shown as applied to an axle having a well known form of roller bearings applied thereto, and, Fig. 2 is a front elevation of the construction shown in Fig. 1, the spokes of the wheels being omitted.

Referring more particularly to the drawings, it will be seen that the construction is applied to an automobile having an axle 10, on which are mounted the conical cages 11, carrying roller bearings 12. These are positioned in a well known manner and are secured in place by means of a nut 13, threaded on the outer end of the axle 10.

My novel hub is composed of an inner bearing member having interior, outwardly flaring, bearing surfaces 14, these surfaces contacting the roller bearings 12. This bearing member is provided with an external annular flange 15, apertured as required to accommodate rivets 16, by means of which the parts of the hub are fastened together. The outer shell of the hub is provided with annular flanges 17, 18, to which the inner and outer rows of wire spokes 19, 20, are connected. Preferably the ends of the spokes are riveted after being inserted in place. The shell of the hub is provided with an annular web 21, apertured to register with the rivet holes in the flange 15. A further member which acts as a support or stiffener is composed of a cylindrical portion 22, and a marginal flange 23, fitting securely against the flange 15. The rivets 16 are passed through the three parts 15, 21 and 23, thus making a very rigid yet simple construction. The outer end 24 of the bearing member is suitably threaded over which is placed the usual hub cap 25.

It will be seen that the only member of the hub necessary to be fitted or made to correspond to the bearings already on the car is the bearing member having the conical surfaces 14. These bearing surfaces may be of certain standard sizes, governing the diameter and length and pitch of bearing. The remainder of the hub may be of the same size for corresponding weights and capacities of cars.

The work of assembling the hub and building up the wheel may be performed by any mechanic without the aid of expensive machinery or tools and the construction provides for the ready adoption of the economical wire wheels without the necessity for expensive changes in the bearing equipment of the car.

It is obvious that certain modifications may be made in the construction herein shown and such modifications as are within the scope of my claim I consider within the spirit of my invention.

I claim:

In a hub for wire wheels, the combination of a bearing member having a radial flange substantially midway in the length thereof, a hub having annular spoke-attaching flanges, said hub being fitted onto said bearing member and having a portion lying against said radial flange, a tubular stiffening member also fitted onto said bearing member and provided with an annular flange bent to lie against the radial flange of said bearing member, and means for securing together said hub, bearing member and stiffening member, substantially as described.

BURLEY B. AYERS.

Witnesses:
WM. L. HIRSCH,
HENRY W. KYTE.